United States Patent
Bezanson et al.

(10) Patent No.: US 12,448,817 B2
(45) Date of Patent: Oct. 21, 2025

(54) MAGNETIC RELEASE MECHANISM

(71) Applicant: Ashored Inc., Debert (CA)

(72) Inventors: Andre Bezanson, Halifax (CA); Guillaume Demers, Wolfe Island (CA)

(73) Assignee: Ashored Inc., Debert (CA)

( * ) Notice: Subject to any disclaimer, the term of this patent is extended or adjusted under 35 U.S.C. 154(b) by 270 days.

(21) Appl. No.: 18/275,749

(22) PCT Filed: Feb. 3, 2022

(86) PCT No.: PCT/CA2022/050156
§ 371 (c)(1),
(2) Date: Aug. 3, 2023

(87) PCT Pub. No.: WO2022/165596
PCT Pub. Date: Aug. 11, 2022

(65) Prior Publication Data
US 2024/0133214 A1 Apr. 25, 2024
US 2024/0229513 A9 Jul. 11, 2024

Related U.S. Application Data

(60) Provisional application No. 63/145,249, filed on Feb. 3, 2021.

(51) Int. Cl.
*E05B 47/02* (2006.01)
*E05B 47/00* (2006.01)

(52) U.S. Cl.
CPC .... *E05B 47/023* (2013.01); *E05B 2047/0054* (2013.01); *E05B 2047/0067* (2013.01); *E05B 2047/0074* (2013.01)

(58) Field of Classification Search
CPC .......... E05B 47/023; E05B 2047/0054; E05B 2047/0067; E05B 2047/0074; A01K 69/06; A01K 69/08; B63B 22/06
See application file for complete search history.

(56) References Cited

U.S. PATENT DOCUMENTS

| | | |
|---|---|---|
| 3,858,166 A | 12/1974 | Hammond |
| 4,262,379 A | 4/1981 | Jankiewicz |
| 5,100,353 A | 3/1992 | Domborwski et al. |
| 7,534,152 B1 | 5/2009 | Lloyd et al. |
| 2019/0110452 A1 | 4/2019 | Greenberg et al. |

FOREIGN PATENT DOCUMENTS

| | | |
|---|---|---|
| CA | 2057361 A1 | 6/1993 |
| CA | 2324508 A1 | 11/1999 |

*Primary Examiner* — Mohamad A Musleh
(74) *Attorney, Agent, or Firm* — SMART & BIGGAR LP

(57) ABSTRACT

A magnetic release mechanism for use with underwater fishing equipment includes a base plate having a slot for receiving a buckle, and a recess for receiving a release plate. A permanent magnet positioned proximate the recess generates a first magnetic field for magnetically coupling the release plate to the base plate. An electromagnetic coil positioned proximate the permanent magnet is configured to selectively generate a second magnetic field when energized. A magnetic field sensor is positioned proximate the recess. A controller is operatively coupled to the magnetic field sensor. The controller may be configured to monitor the magnetic field sensor to detect the presence of a third magnetic field and, in response to detecting the presence of a third magnetic field, output a signal indicating that the release plate is magnetically secured within the recess.

20 Claims, 17 Drawing Sheets

MAGNETIC RELEASE MECHANISM

CROSS REFERENCE TO RELATED APPLICATION

This application is a 35 USC § 371 national stage entry of International Patent Application No. PCT/CA2022/050156 filed Feb. 3, 2022, which claims the benefit of priority to U.S. Provisional Application No. 63/145,249, filed Feb. 3, 2021, the contents of which are incorporated herein by reference in its entirety.

FIELD

This disclosure relates generally to the field of magnetic release mechanisms, and more specifically to magnetic release mechanisms used in underwater fishing applications.

INTRODUCTION

In the fishing industry, and particularly in the crustacean fishing industry, equipment may be left underwater for a period of time and later hoisted to the surface. For example, traditionally, lobster traps placed on the ocean floor are attached to a buoy with a rope. To retrieve the trap, a fisher may pilot a boat to the buoy, then pull the trap out of the water by the rope.

In some systems, which may be characterized as "rope-on-command" fishing systems, a buoy is connected to a release mechanism by a rope and may be lowered to the ocean floor along with the fishing gear, such as a trap, e.g., by providing additional ballast to the release mechanism to counteract the buoyant force of the buoy. In such systems, a fisher may activate a release mechanism (e.g., remotely from the surface) that allows the buoy to surface, where a fisher can pull the trap out of the water by the trailing rope. Some known release mechanisms used in underwater gear retrieval systems include a magnetic release.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

While release mechanisms for underwater "rope-on-command" fishing applications are known, typical release mechanisms often have complex designs with many moving and/or turning parts. For example, known release mechanisms for fishing applications may include 'burn wire' (which burns through a holding member), a rotating latch (e.g., a small pin that rotates to release a latch and then the buoy/rope), and/or a rotating screw. These designs may make it difficult to arm the release mechanisms, e.g., in the dark and/or while wearing gloves. Additionally, a mechanism with a relatively large number of parts may result in an increased likelihood of the device failing and/or being corroded. Furthermore, known designs typically require a user to perform a separate step of configuring the device (e.g., interacting with control electronics) to ensure that the release mechanism is armed before placing it in the ocean. Manually setting the status of the release mechanism can be difficult and time-consuming, which may disrupt the workflow of a user.

As disclosed herein, a magnetic release mechanism has a simplified design with few moving parts. The magnetic release mechanism has a release plate that is inserted into an area on a base plate. The release plate holds a buckle in place, e.g., against the upward force of a buoy, using magnetic force. When the mechanism is unlocked, the holding force of the release plate is lowered, thereby allowing an upward force applied to the buckle to release the buckle. An advantage of this design is that the only moving parts are the release plate and the buckle, thereby simplifying the design and reducing the likelihood of failure and/or corrosion.

In accordance with one broad aspect of this disclosure, there is provided a magnetic release mechanism for use with underwater fishing equipment comprising a buoyant element, the magnetic release mechanism comprising: a base plate having an upwardly facing surface that includes a buckle recess and a release plate area, the area having a first end and a second end, the area overlying at least a portion of the buckle recess; a buckle having a first end releasably received in the recess, wherein an aperture extends through a width of the buckle; a release plate positioned in the area and extending optionally at least partially through the aperture, the release plate having a first end and a second end; a mechanical restraining member positioned proximate the first end of the area and inhibiting upward displacement of the first end of the release plate; a permanent magnet positioned proximate the second end of the area and below the area, the permanent magnet generating a first magnetic field; an electromagnetic coil positioned proximate the permanent magnet and configured to selectively generate a second magnetic field when energized; and a magnetic sensor positioned below the area and between the permanent magnet and the first end of the area, the sensor being configured to detect the presence of a third magnetic field; wherein, in a locked configuration, the electromagnetic coil is de-energized, upward displacement of the second end of the release plate is inhibited by a first magnetic force resulting from the first magnetic field, and an upward force exerted on the buckle by the buoyant element is insufficient to displace the first end of the buckle from the recess, and wherein, in an unlocked configuration, the electromagnetic coil is energized, upward displacement of the second end of the release plate is inhibited by a second magnetic force resulting from the first magnetic field and the second magnetic field, the second magnetic force being less than the first magnetic force, and the upward force exerted on the buckle by the buoyant element is sufficient to displace the first end of the buckle from the recess.

In some embodiments, the recess is positioned proximate the first end of the area.

In some embodiments, the base plate further comprises one or more projections extending upwardly from the upwardly facing surface to inhibit lateral displacement of the release plate relative to the upwardly facing surface.

In some embodiments, the one or more projections restrain the second end of the release plate from moving in a plane parallel to the upwardly facing surface.

In some embodiments, the mechanical restraining member comprises a flange that overhangs the first end of the area.

In some embodiments, in the locked position, the release plate abuts the sensor.

In some embodiments, the first end of the release plate has a chamfered edge.

In some embodiments, the magnetic release mechanism further comprises a controller configured to provide a signal when the sensor detects the presence of the third magnetic field.

In some embodiments, the buckle is coupled to an openable member, the openable member moving from a closed position to an open position when the first end of the buckle is removed from the buckle recess.

In some embodiments, the first magnetic force is between about 15 lb to about 35 lb.

In some embodiments, the first magnetic force is about 25 lb.

In some embodiments, the magnetic release mechanism further comprises at least a second buoyant element.

In some embodiments, the buoyant element is configured to exert an upward force of about 100 lb. to 200 lb. when submerged at a depth of about 50 m to 150 m below sea level, optionally about 16 lb. to about 200 lb. when submerged at a depth of about 50 m to about 200 m below sea level.

In some embodiments, the buoyant element is configured to exert an upward force of about 150 lb. when submerged at a depth of about 100 m below sea level.

In some embodiments, the magnetic release mechanism further comprises an acoustic receiver and a controller, wherein the controller is configured to: monitor the acoustic receiver; and in response to detecting an acoustic release signal, energize the electromagnetic coil.

In some embodiments, the magnetic release mechanism further comprises a controller, wherein the controller is configured to: monitor the sensor; and in response determining that a predetermined time period following detecting the presence of the third magnetic field has elapsed, energize the electromagnetic coil.

In accordance with another aspect of this disclosure, the magnetic release mechanism includes a magnetic field sensor for detecting the presence of a magnetic field in a release plate. A controller is configured to provide a signal indicating that the release plate is in place and that the mechanism is armed. An advantage of this design is that the user may easily determine whether the mechanism is armed based on the positioning of the release plate.

In accordance with this aspect, there is provided a magnetic release mechanism for use with underwater fishing equipment comprising a buoyant element, the magnetic release mechanism comprising: a base plate having a slot for receiving a buckle, and a recess for receiving a release plate, the recess having a first end and a second end; a permanent magnet positioned proximate the recess and closer to the second end than the first end, the permanent magnet generating a first magnetic field for magnetically coupling the release plate to the base plate; an electromagnetic coil positioned proximate the permanent magnet and configured to selectively generate a second magnetic field when energized; a magnetic field sensor positioned proximate the recess and between the first end and the permanent magnet; and a controller operatively coupled to the magnetic field sensor; wherein the controller is configured to: monitor the magnetic field sensor to detect the presence of a third magnetic field; and in response to detecting the presence of a third magnetic field, output a signal indicating that the release plate is magnetically secured within the recess.

In some embodiments, the magnetic field sensor comprises a magnetic reed sensor.

In some embodiments, the controller is configured to output the signal to a remote computing device.

In some embodiments, the magnetic release mechanism further comprises a wireless transceiver, and the controller is configured to output the signal to the remote computing device via the wireless transceiver.

In some embodiments, the magnetic release mechanism further comprises a visual indicator coupled to the base plate, wherein the controller is configured to output the signal to the visual indicator.

In some embodiments, the controller is further configured to: in response determining that a predetermined time period following detecting the presence of the third magnetic field has elapsed, energize the electromagnetic coil.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
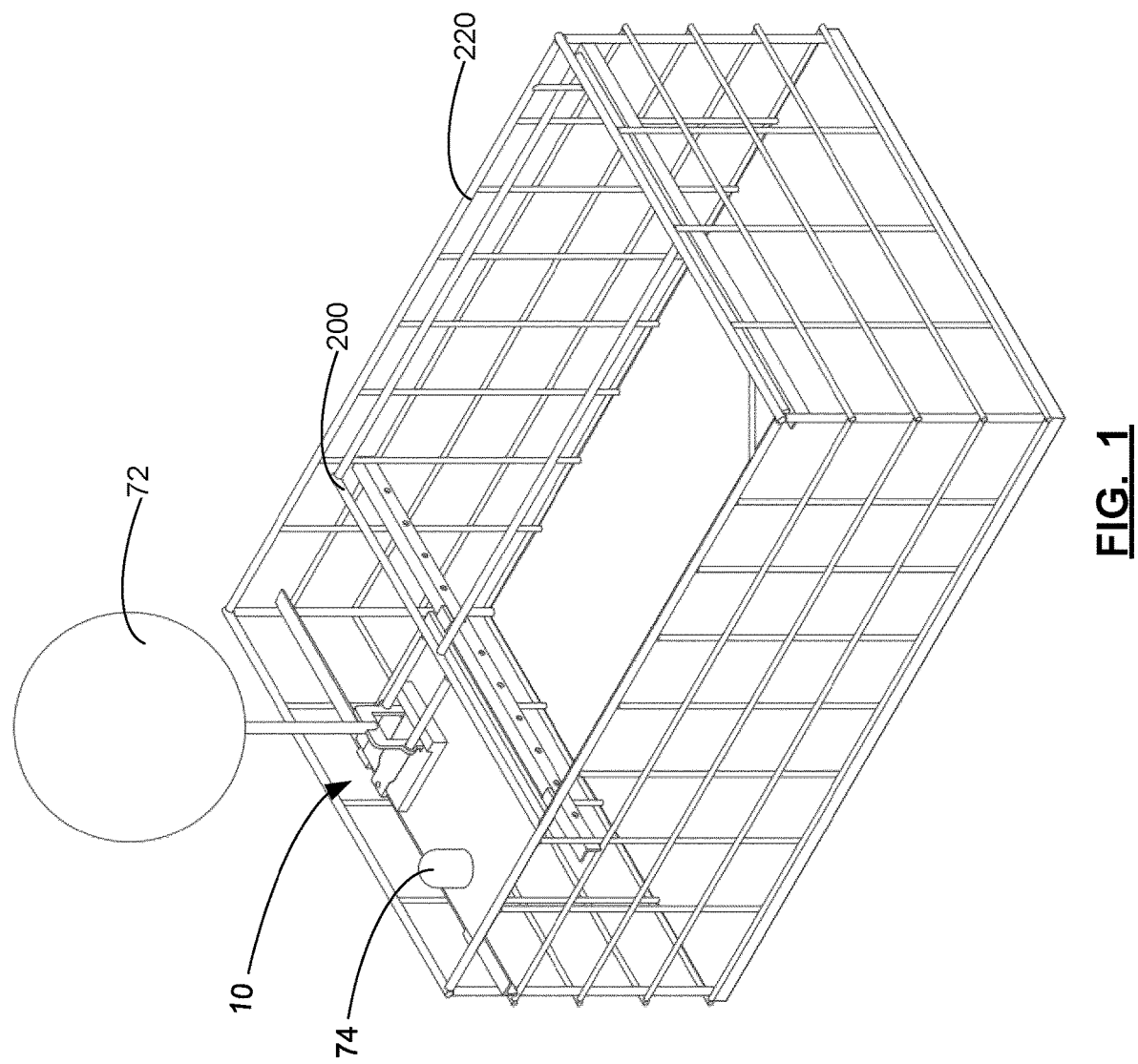
FIG. 1 is a front perspective view of a magnetic locking mechanism on a cage.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

General Description of a Release Mechanism

Referring to FIGS. 1-10, an exemplary embodiment of a magnetic release mechanism is shown generally as 10. The following is a general discussion of mechanism 10, which provides a basis for understanding several of the features that are discussed herein. As discussed subsequently, each of the features may be used individually or in any particular combination or sub-combination in this or in other embodiments disclosed herein.

FIGS. 1-10 illustrate an example embodiment of a magnetic release mechanism 10. The mechanism 10 has a base plate 20, a release plate 40, and a buckle 60. When in a locked configuration, the release plate 40 inhibits the buckle 60 from being removed from the base plate by an upwardly applied force. When in an unlocked configuration, the release plate 40 is more easily removable, such that the buckle 60 may be removed by an upwardly applied force that would be insufficient to dislodge the release plate and buckle in the locked configuration.

FIGS. 11-17 illustrate another example embodiment of a magnetic release mechanism 10. The mechanism 10 has a base plate 20, a release plate 40, and a key buoy 76 mechanically attached to the release plate 40. When in a locked configuration, an upward force applied by the key buoy 76 to the release plate 40 is insufficient to separate the release plate 40 form the based plate 20. When in an unlocked configuration, the upward force applied by the key buoy 76 to the release plate 40 is sufficient to dislodge the release plate 40 from the base plate 20.

The buckle 60 may be any shape and/or size that facilitates maintaining the closure of an enclosure, such as the cage shown in FIG. 1. The buckle 60 may be a separate element attached to an arm 202 of the lid 200, as shown in FIGS. 1-10. In some embodiments, the buckle 60 may be the arm of the lid 200, as shown in FIGS. 11-17.

As shown in FIGS. 1-17, the buckle 60 includes an aperture 68. In some embodiments, the aperture 68 may be a machined slot in the buckle, as shown in FIGS. 1-10. In some embodiments, the aperture 68 may be formed by the shape of the buckle 60 itself. For example, as shown in FIGS. 11-17, the arms of the buckle 60 form a U-shape having the aperture 68.

The base plate 20 includes a permanent magnet 80 that generates a first magnetic field 82. The permanent magnet 80 is used for securing the release plate 40 in the locked position. The base plate 20 also includes an electromagnet 100 that is configured to generate a second magnetic field when energized. The first and second magnetic fields have opposing polarities, such that the net magnetic force resulting from the first and second magnetic fields is lower than the magnetic force resulting from the first magnetic field. Accordingly, the electromagnet 100 may be used to unlock the mechanism 10 by reducing the net magnetic holding force on the release plate.

Locked Configuration

Figure 2:
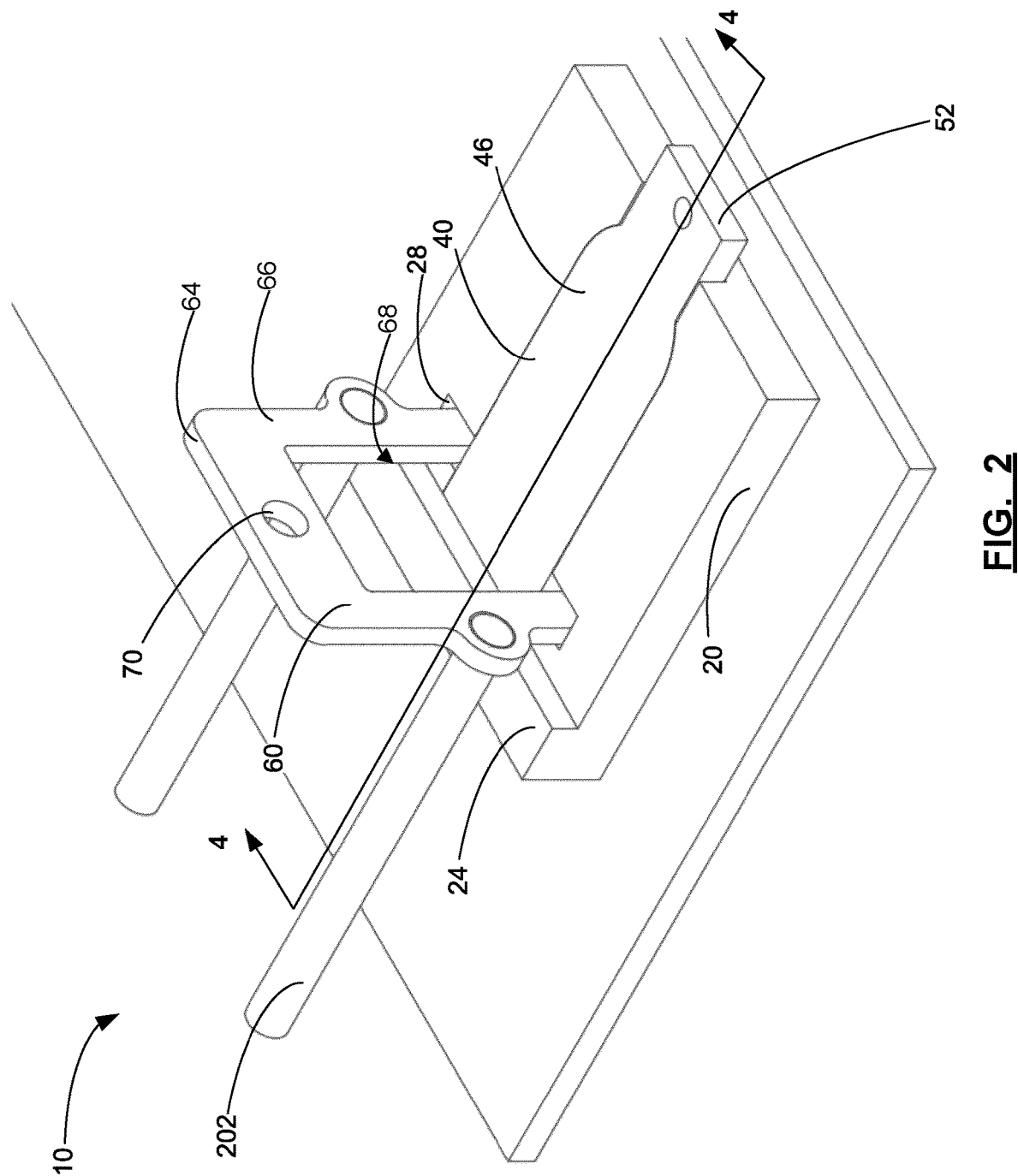
FIG. 2 is a front perspective view of the magnetic locking mechanism of FIG. 1 in a locked configuration.
Figure 3:
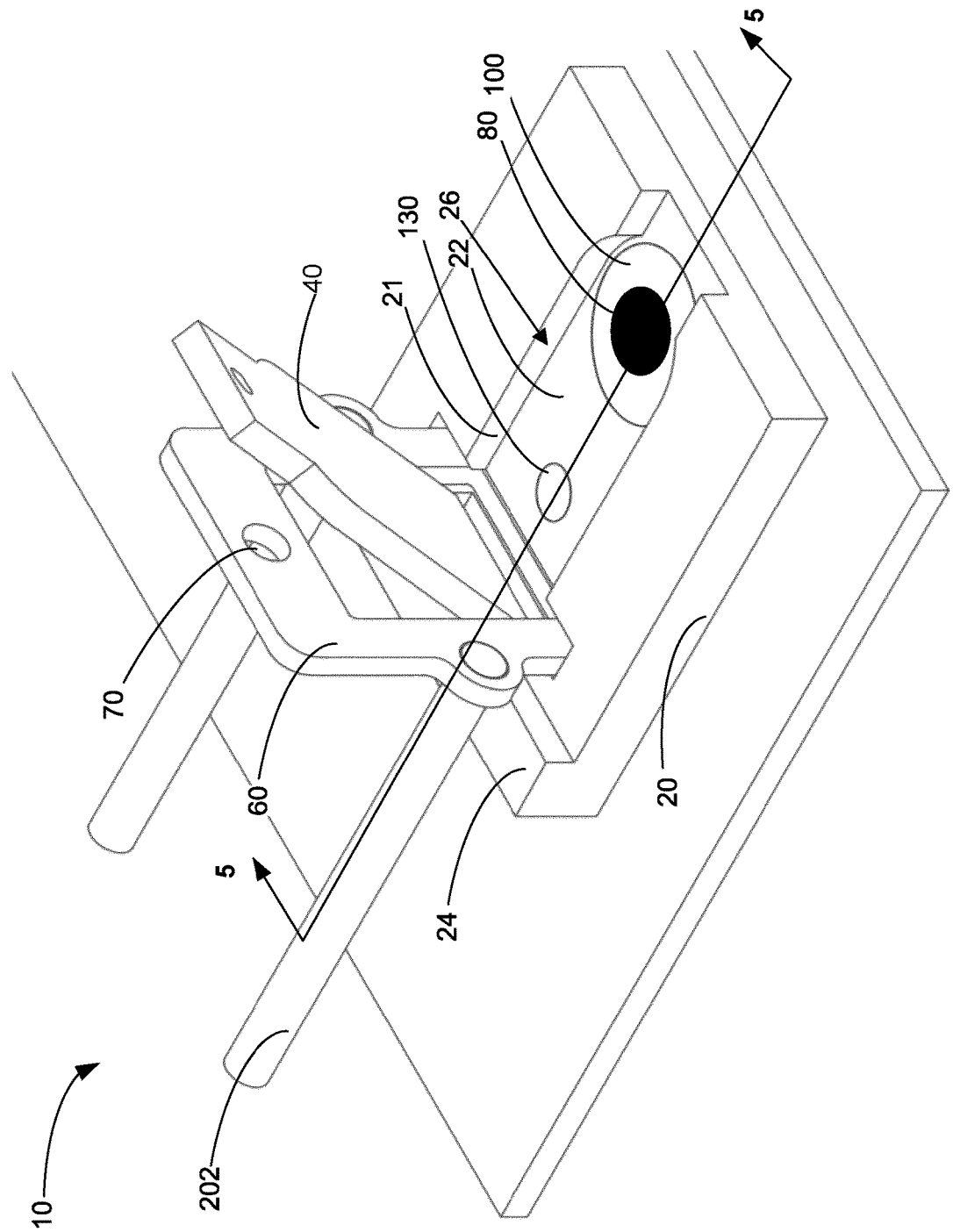
FIG. 3 is a front perspective view of the magnetic locking mechanism of FIG. 1 in an unlocked configuration.

Turning to FIG. 2, in a first configuration the electromagnet 100 is de-energized and the release plate 40 is positioned within an area 26 and through the aperture 68 in buckle 60. This may be characterized as a locked configuration. In such a configuration, the release plate 40 restrains the buckle 60 such that an upward force exerted on the buckle 60 (e.g., by a buoyant element 72) is insufficient to displace the first end 62 of the buckle 60 from the recess 28. Such a release mechanism may have one or more advantages. For example, a user may lock the mechanism 10 simply by positioning the release plate 40 through the buckle and against the base plate 20, without the need to take additional steps. This may facilitate the mechanism 10 being locked by a user (e.g., using only one hand, and/or while wearing gloves).

In the illustrated example, the base plate 20 has an upwardly facing surface 22 and a mechanical restraining member 24. The base plate 20 also has a release plate area 26 and a buckle recess 28. The release plate area 26 has a first end 27 and a second end 29. The release plate 40 is positionable within the release plate area 26 and the buckle 60 is positionable within the buckle recess 28. In the illustrated embodiment, the release plate area 26 overlies at least a portion of the buckle recess 28. In the illustrated example, the buckle recess 28 is in the form of a slot.

In the illustrated example, release plate 40 has a first end 42 and a second end 44 with a body 46 extending therebetween. The release plate body 46 may have a profile that matches the profile of the release plate area 26 such that when the release plate 40 is positioned within the release plate area 26, the release plate 40 is restrained from motion in a plane parallel to the upwardly facing surface 22. For example, in the illustrated example release plate area 26 is bounded partially by sidewalls 21.

When the release plate 40 is positioned within the release plate area 26, the first end 42 of the release plate 40 is engages the mechanical restraining member 24, thereby inhibiting upward displacement of the first end 42 of the release plate 40.

In the example illustrated in FIGS. 4-7, the mechanical restraining member 24 is a flange extending from the base plate 20 and overlying a portion of the area 26. As shown, the flange 24 forms an overhang that receives the release plate 40. It will be appreciated that the mechanical restraining member 24 may be any shape or size. The mechanical restraining member 24 may restrain the first end 42 of the release plate 40 from moving both in a plane normal and in a plane parallel to the upwardly facing surface 22.

As exemplified in FIGS. 1-10, the buckle 60 has a first end 62, a second end 64, and a buckle body 66 extending therebetween. The buckle body 66 has an aperture 68 for receiving the release plate 40 when the release plate 40 is positioned within the release plate area 26. As shown, the aperture 68 extends through a width of the buckle 60.

Figure 10:
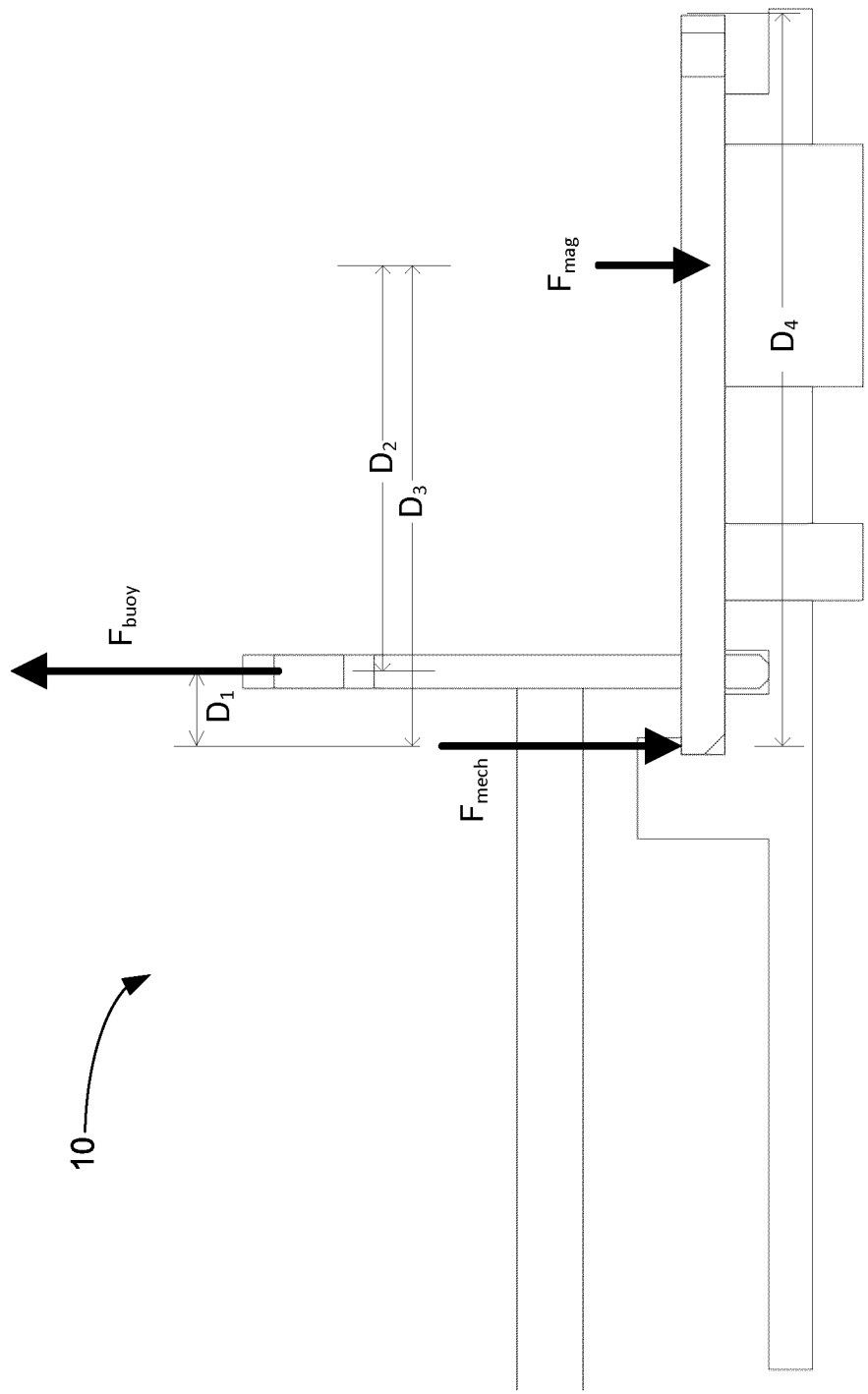
FIG. 10 is a schematic diagram of the magnetic locking mechanism of FIG. 1.

Referring to FIGS. 1, 2, 4, 6, 8, and 10, the mechanism 10 is shown in the locked configuration. As exemplified, the release plate 40 is positioned within the release plate area 26 and is proximate the permanent magnet 80 such that the first magnetic field 82 produces a first magnetic force that acts on the release plate 40, as illustrated in FIG. 10. The first magnetic force inhibits upward displacement of the second end 44 of the release plate 40. As exemplified, when the release plate 40 is in the release plate area 26, the magnet 80 is proximate to, and below, the second end 29 of the area 26. Additionally, the first end 42 of the release plate 40 is inhibited from upward displacement by the mechanical restraining member 24. Accordingly, the first end 42 is restrained from being lifted in a direction normal to the upwardly facing surface 22 of the base plate while the magnetic force from the magnet 80 provides a magnetic force proximate the second end 44 of the release plate, thereby inhibiting the release plate 40 against upward displacement from the release plate area 26.

As exemplified, in the locked configuration, the first end 62 of the buckle 60 is positioned within the buckle recess 28, with the buckle 60 extending in a direction normal to the upwardly facing surface 22 of the base plate 20. In this configuration, the release plate 40 is positioned through the aperture 68 of the buckle 60. Accordingly, restraining the first end 42 of release plate 40 with the mechanical restraining member 24 and the second end 44 with the magnet 80 produces a mechanical advantage that inhibits upward displacement of the buckle 60 from the buckle recess 28. For example, as shown in FIG. 1, the buckle 60 includes an attachment member 70 for attaching a buoyant member 72. When the mechanism 10 is underwater, the buoyant member 72 provides an upward force to the buckle 60. In the locked configuration, the upward force exerted on the buckle 60 by the buoyant element 72 is insufficient to displace the first end 62 of the buckle 60 from the buckle recess 28.

Figure 11:
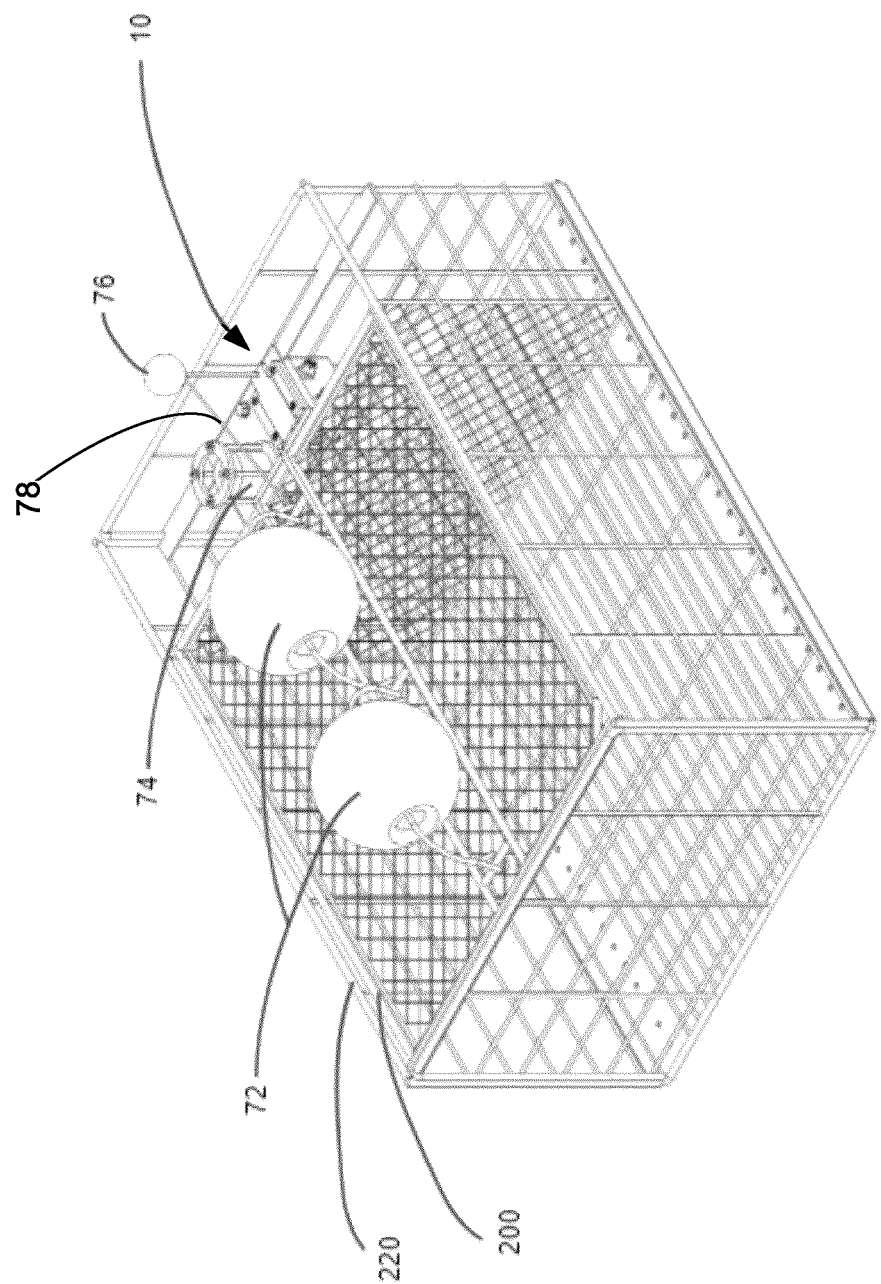
FIG. 11 is a front perspective view of another embodiment of a magnetic locking mechanism on a cage.

Turning now to FIG. 11, shown herein is another embodiment of a magnetic release mechanism 10. The configuration of the magnetic release mechanism 10 shown in FIGS. 11-17 may include components as described in relation to the embodiment shown in FIGS. 1-10.

Figure 12:
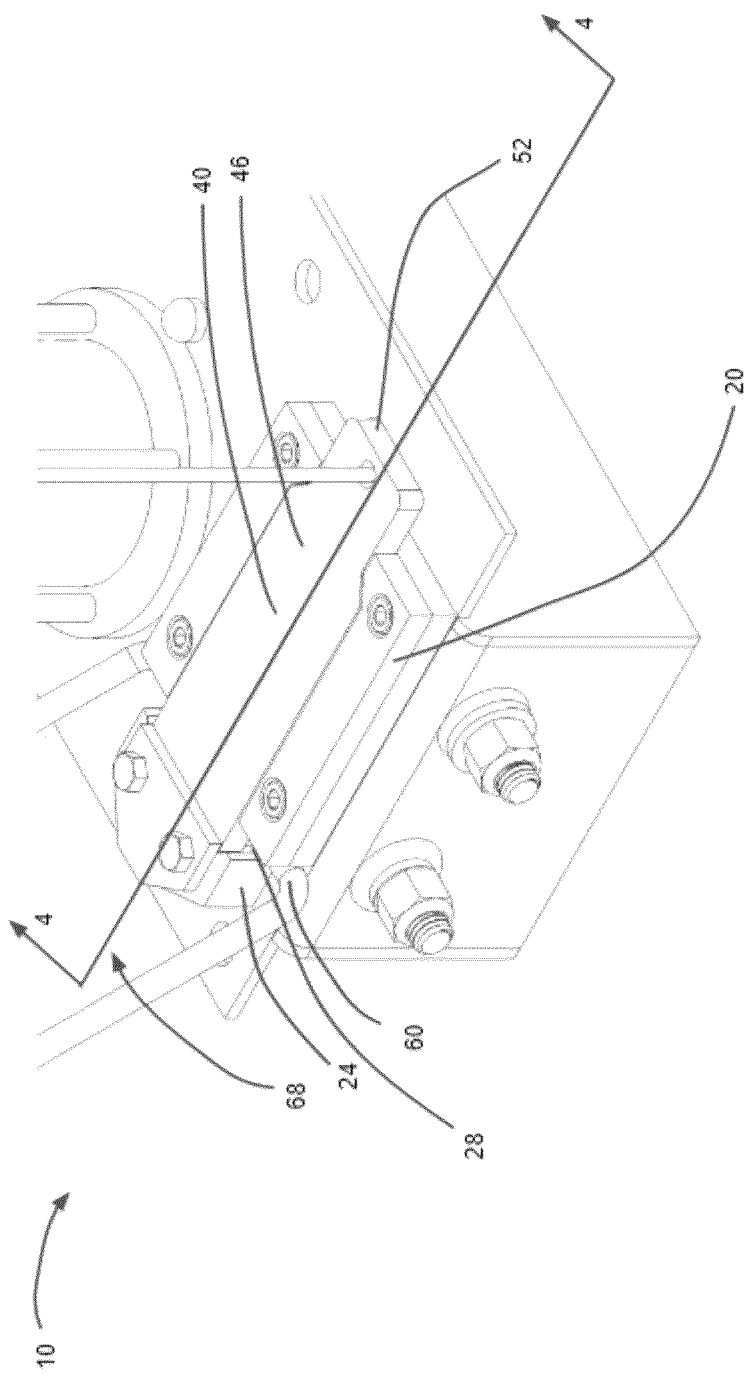
FIG. 12 is a front perspective view of the magnetic locking mechanism of FIG. 11 in a locked configuration.

As exemplified in FIG. 12, the electromagnet 100 is de-energized and the release plate 40 is positioned within an area 26. The release plate 40 may include a mechanically connected key buoy 76. The key buoy 76 may include a buoy attached to the release plate by a rope, a rod, or any other connecting mechanism. The key buoy 76 may be connected to release plate 40 at any location along the release plate body 46. For example, the key buoy 76 may be connected to the release plate 40 at the second end 44 of the release plate, as exemplified in FIGS. 11 and 12. The release plate 40 may restrain the key buoy 76 such that an upward force exerted by the key buoy 76 on the release plate 40 is insufficient to displace the release plate 40 from the base plate 20. The key buoy 76 may have a buoyant force of around 3 lb. FIG. 11 shows buoyant members 72 in connection with the lid 200 of cage 220. In some embodiments, there may be any number of buoyant members 72 attached to the lid 200. For example, a large and/or heavy lid 200 may require additional and/or larger buoyant members 72 to achieve buoyancy of the lid 200. As described previously, the buoyant members 72 apply an upward force to the buckle 60. When in the locked configuration, the upward force exerted on the buckle 60 by the buoyant members 72 is insufficient to displace the buckle 60.

The buckle 60, as shown in FIG. 12, may extend from the lid 200 of cage 220 into buckle recess 28 of the base plate 20. The buckle 60 has a first end 62 and an aperture 68 for receiving the release plate 40 when the release plate 40 is positioned within the release plate area 26. The first end 62 of the buckle may be positioned within the buckle recess 28 and below the release plate 40.

As exemplified in FIG. 12, in the locked configuration, the key buoy 76 extends in a direction normal to the upwardly facing surface 22 of the base plate 20. Accordingly, the first end 42 of release plate 40 is restrained by the mechanical restraining member 24 and the second end 44 is restrained by the magnet 80. These restraints produce a mechanical advantage that inhibits upward displacement of the key buoy 76. When the mechanism 10 is underwater, the key buoy 76 provides an upward force that is applied to the release plate 40. In the locked configuration, the upward force exerted on the key buoy 76 is insufficient to displace the release plate 40.

As exemplified in FIGS. 1, 2, 4, 6, 8, 10, 11, 12, 14, and 16 the magnet 80 and the mechanical restraining member 24 each resist the upward force applied to the buckle 60 by the buoyant member 72 and/or the key buoy 76. FIG. 10 is a simplified schematic force diagram, in which $F_{mech}$ is the downward force exerted on the first end 42 of release plate 40 by mechanical restraining member 24, $F_{mag}$ is the downward force exerted on release plate 40 by permanent magnet 80, and $F_{buoy}$ is the upward force exerted on buckle 60 by e.g. buoyant member 72, $D_1$ is the lateral distance between $F_{mech}$ and $F_{buoy}$, $D_2$ is the lateral distance between $F_{buoy}$ and $F_{mag}$, $D_3$ is the lateral distance between $F_{mech}$ and $F_{mag}$, and $D_4$ is the lateral distance between $F_{mech}$ and removal tab 52.

It will be appreciated that the magnet 80 may be positioned anywhere between the buckle 60 and the second end 44 of the release plate 40, provided the magnetic field 82 is sufficient to restrain the buckle 60 from being moved by the buoyant member 72. As exemplified in FIGS. 1-17, the magnet 80 is positioned closer to the second end 29 than the first end 27 of the area 26. The mechanical advantage required to restrain the buckle 60 may be calculated as a ratio of the distance from the mechanical restraining member 24 to the buckle recess 28 and the distance from the mechanical restraining member 24 to the permanent magnet 80 (e.g., D1/D3, with reference to FIG. 10). Accordingly, the magnetic force required may vary with the buoyant force generated by the buoyant member 72 and/or the key buoy 76. For example, in some embodiments, the magnetic force generated by the magnet 80 is in the range of about 7.5 lb to about 35 lb, preferably about 25 lb. The release mechanism 10 may be configured such that the magnetic force generated by the magnet 80 is operable to restrain the buckle 60 from being released against a buoyant force in the range of about 8 lb (e.g. for shallow water applications with a small buoy) to up to about 200 lb (e.g. for applications with high currents and the resulting drag on the line that pulls the buoy under the surface when it is released, such as conditions in the Bay of Fundy), preferably about 150 lb (e.g. for typical fishing applications). It will be appreciated that the strength of the magnetic force may vary with the buoyant force provided by the buoyant member and with the position of the magnet 80 relative to the buckle 60. Additionally, it will be appreciated that the strength of the buoyant force will vary with the depth that the mechanism 10 is positioned underwater (e.g., from about 20 m to about 600 m, with about 50 m to about 150 m being a typical range for most fishing applications).

While the embodiments shown use the release plate area 26 for receiving the release plate 40, it will be appreciated that, in some embodiments, one or more projections extending upwardly from the upwardly facing surface 22 of the base plate 20 may be used to inhibit lateral displacement of the release plate 40 relative to the upwardly facing surface 22. The one or more projections restrain the second end 42 of the release plate 40 from moving in a plane parallel to the upwardly facing surface 22 of the base plate 20.

It will be appreciated that the shape of the first end of the release plate may be any shape that is receivable within the release plate area 26. For example, the first end may be, including, but not limited to, square, rounded, chamfered, or any other shape. In some embodiments, as exemplified in FIGS. 4-9, the release plate 40 may have a chamfered edge 48. The chamfered edge 48 may allow the user to position the release plate 40 more easily within the release plate area 26 and the mechanical restraining member 24. The chamfered edge 48 may also facilitate the removal of the release plate 40 from the mechanical restraining member 24.

As described above, magnetic field 82 of the permanent magnet 80 produces a magnetic force that acts on the release plate 40. Accordingly, the release plate 40 is at least partially ferro-magnetic. For example, the entire release plate 40 may be made of a ferrous material. It will be appreciated that, in some embodiments, the release plate 40 may be partially made of a ferro-magnetic material. For example, the release plate 40 may have a ferro-magnetic core and a non-ferro-magnetic material that surrounds the ferro-magnetic core. Alternately or additionally, the release plate 40 may have a ferro-magnetic coating that coats a non-ferro-magnetic material.

In some embodiments, the release plate 40 may have a removal tab 52, as exemplified in FIGS. 1-17. The removal tab 52 may allow the user to disarm the system by hand by providing a grip for the user to lift the release plate 40 out of the area 26.

In some embodiments, the user may manually lift the key buoy 76 to overcome the magnetic force on the release plate 40 such that the release plate 40 is removed from the base plate 20. By lifting the key buoy 70, the release plate 40 may be removed easily and the system may be disarmed. In other words, the magnetic field 82 of the permanent magnet 80 may be large enough to prevent the upward force of the buoy 76 from releasing the release plate 40, but low enough that the user may unlock the cage by hand.

In some embodiments, the release plate 40 may be attached by a tether (not shown) to the base plate 20. For example, a piece of rope may be used to connect the release plate to the base plate. In some embodiments, the tether 78, as shown in FIG. 11, may be attached to the key buoy 76. For example, the key buoy 76 may be connected to the lid 200 of the cage 220 by a piece of rope that forms the tether 78. An advantage of this design is that the release plate 40 may be removed from the recess 20 without losing the release plate 40 and/or the key buoy 76.

Unlocked Configuration

In a second configuration, electromagnet 100 is energized to generate a magnetic field that at least partially offsets the magnetic field generated by permanent magnet 80. This may be characterized as an unlocked configuration. In such a configuration, the electromagnet 100 produces a second magnetic field that reduces the net magnetic force applied to the release plate 40, such that an upward force exerted on the buckle 60, e.g., by a buoyant element 72, is sufficient to displace the first end 62 of the buckle 60 from the recess 28.

In another configuration, the second magnetic field produced by the electromagnet 100 reduces the net magnetic force applied to the release plate 40 such that an upward force exerted on the release plate 40, e.g., by the key buoy 76, is sufficient to displace the release plate 40 from the release plate area 26 and the buckle 60 from the recess 28. An advantage of these embodiments is that the mechanism 10 may be unlocked simply by energizing the electromagnet 100, without taking additional steps. Another advantage is that permanent magnet 80 maintains the locked configuration in a passive state (i.e., without external power), and power is only required to unlock the mechanism 10.

In accordance with this aspect, the electromagnet 100 is configured to produce a second magnetic field when it is energized. In some embodiments, the electromagnet 100 may be an electromagnetic coil that is wrapped around the permanent magnet 80. The second magnetic field operates opposite to the first magnetic field 82 such that when the electromagnet 100 is energized, the net magnetic field resulting from the interaction of the first and second magnetic fields is weaker than the first magnetic field. Accordingly, when the electromagnet 100 is energized a second magnetic force inhibits the upward displacement of the second end 44 of the release plate 40, the second magnetic force being less than the first magnetic force that acts on the release plate 40 when the electromagnet 100 is not energized.

In one embodiment, the release mechanism 10 may be configured such that the second magnetic force is low enough that the upward force exerted on the buckle 60 by the buoyant element 72 is sufficient to displace the first end 62 of the buckle 60 from the recess 28. Accordingly, when the electromagnet 100 is energized, the force inhibiting the second end 44 of the release plate 40 is reduced such that the buckle 60 is movable by the upwardly applied force. As described above, when the mechanism 10 is underwater, the buoyant member 72 applies the upward force to the buckle 60. Thus, when the electromagnet 100 is activated, the mechanism 10 is unlocked and the buoyant member 72 may lift the buckle 60 out of the buckle recess 28, e.g., as illustrated in FIGS. 3, 5, 7, and 9.

Figure 13:
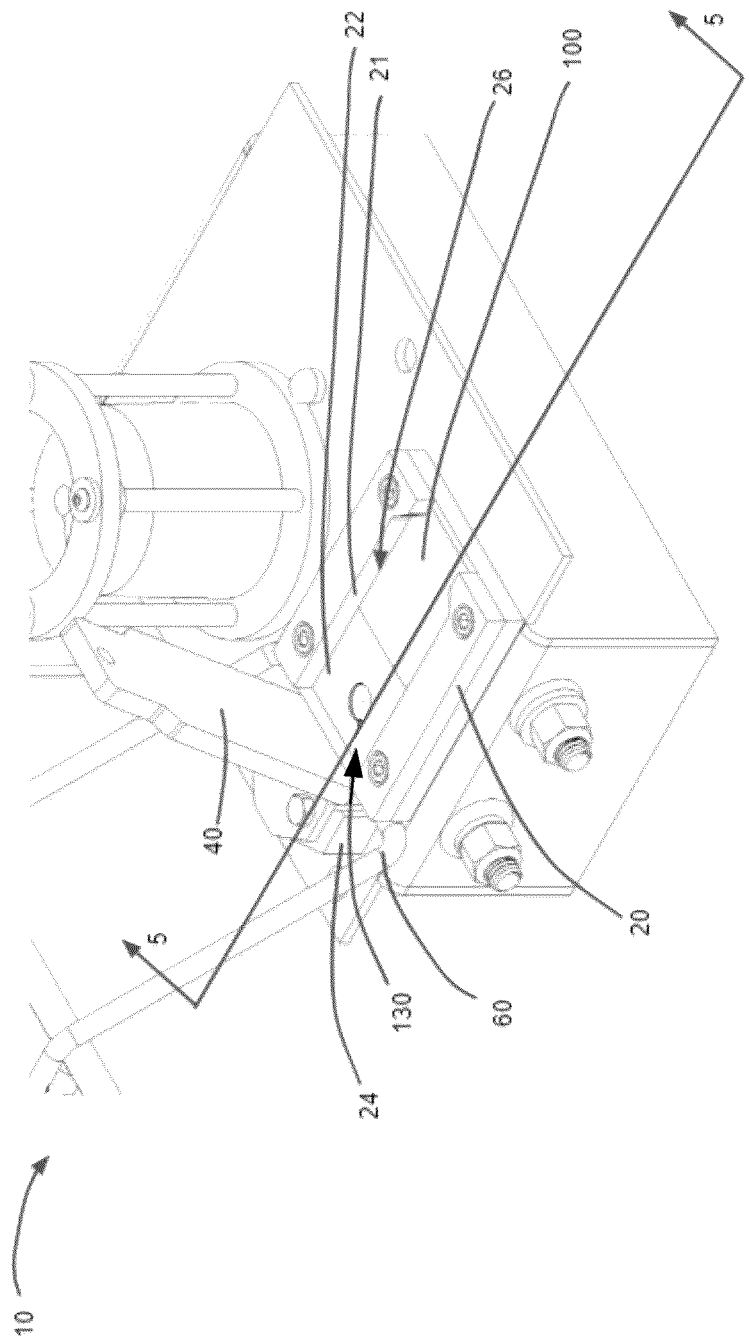
FIG. 13 is a front perspective view of the magnetic locking mechanism of FIG. 11 in an unlocked configuration.
Figure 14:
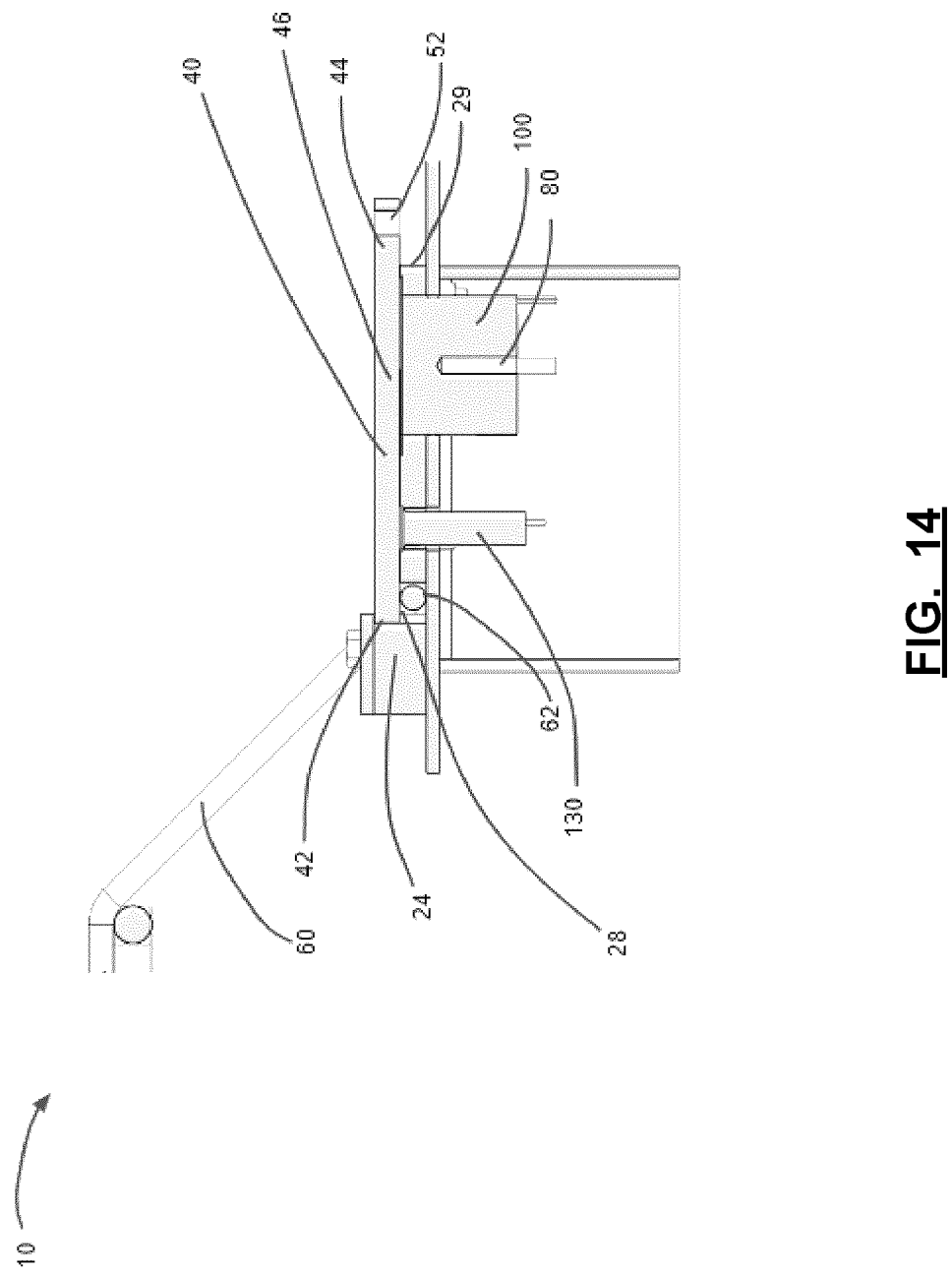
FIG. 14 is a cross-sectional side view of the magnetic locking mechanism of FIG. 11 in the locked configuration, along the line 4-4 in FIG. 12.
Figure 15:
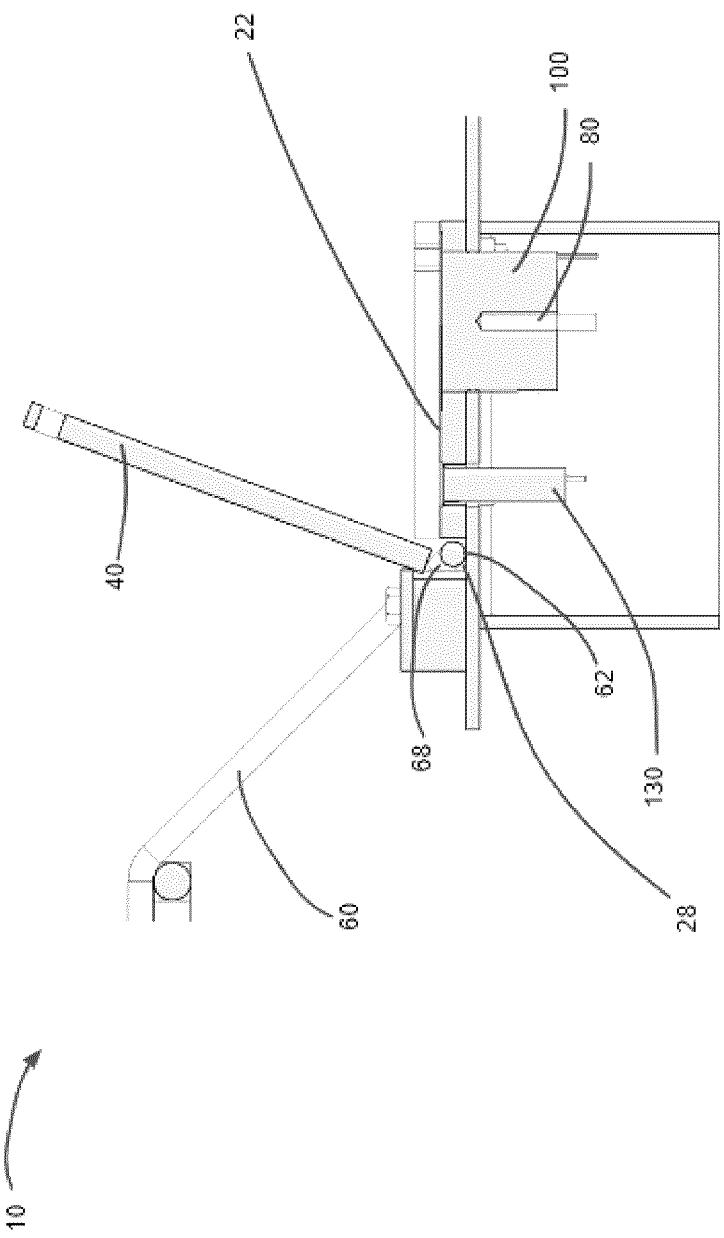
FIG. 15 is a cross-sectional side view of the magnetic locking mechanism of FIG. 11 in the unlocked configuration, along the line 5-5 in FIG. 13.
Figure 16:
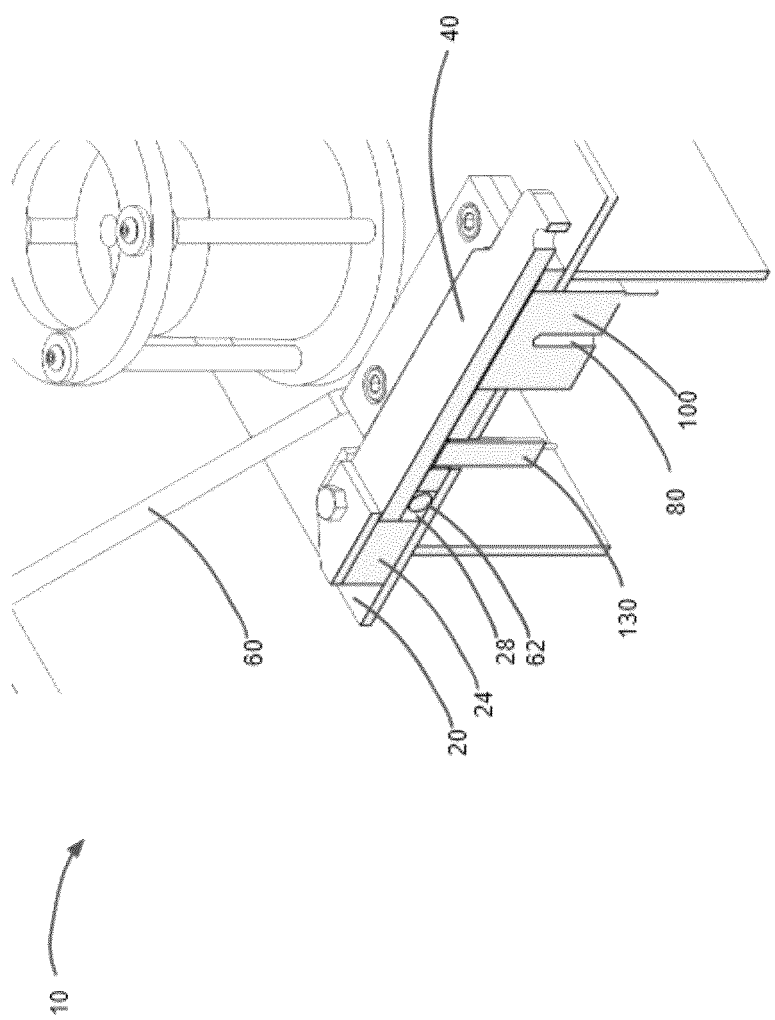
FIG. 16 is a cross-sectional perspective view of the magnetic locking mechanism of FIG. 11 in the locked configuration, along the line 4-4 in FIG. 12.
Figure 17:
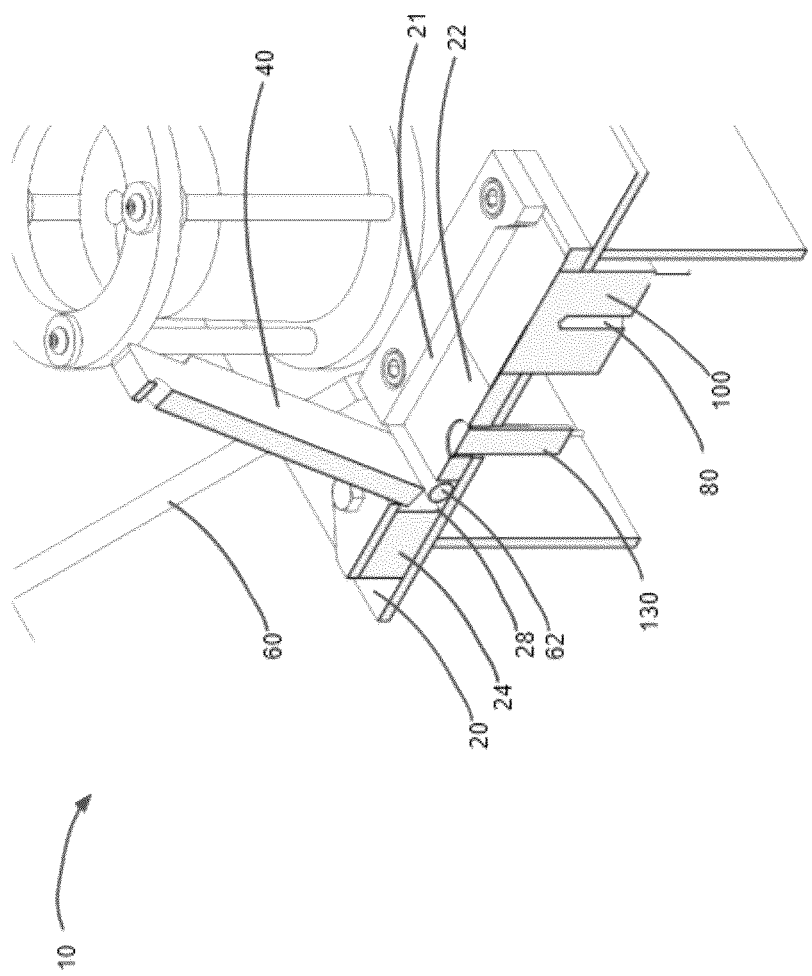
FIG. 17 is a cross-sectional perspective view of the magnetic locking mechanism of FIG. 11 in the unlocked configuration, along the line 5-5 in FIG. 13.

In some embodiments, the release mechanism 10 may be configured such that the second magnetic force is low enough that the upward force exerted on the release plate 40 by the key buoy 76 is sufficient to displace the release plate 40 from the release plate area 26. The displacement of the release plate 40 from the release plate area 60 may result in the first end 62 of the buckle 60 being displaced from the recess 28. Accordingly, when the electromagnet 100 is energized, the force inhibiting the second end 44 of the release plate 40 is reduced such that the release plate 40 is movable by the upwardly applied force of the key buoy 76. When the release plate 40 is removed from the release plate area 60, an upward force is applied to the buckle 60, e.g., by the buoyant member 72, lifting the buckle 60 from the recess 28. Thus, when the electromagnet 100 is activated, the mechanism 10 is unlocked and the key buoy 76 may lift the release plate 40, e.g., as illustrated in FIGS. 13, 15 and 17.

Figure 4:
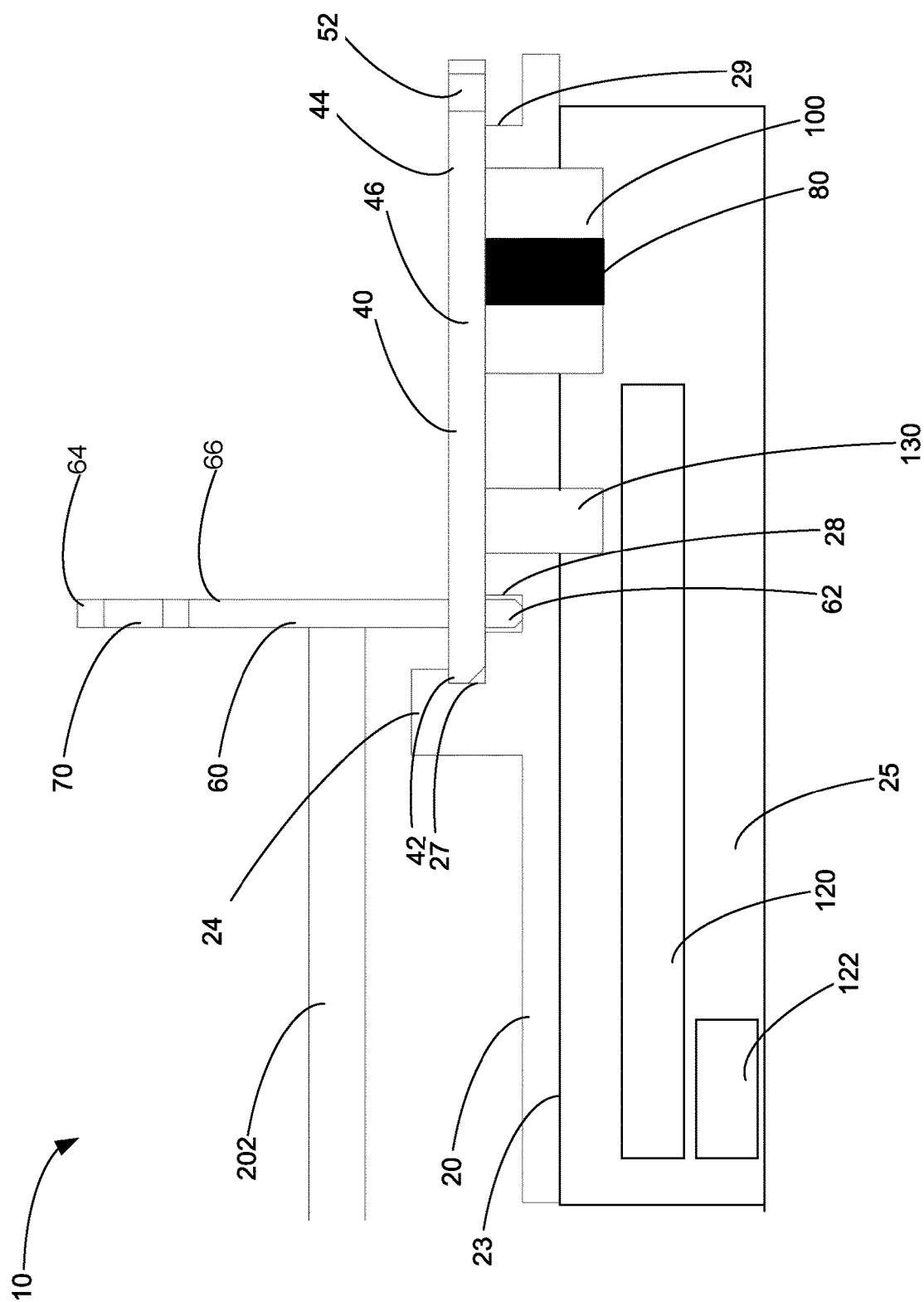
FIG. 4 is a cross-sectional side view of the magnetic locking mechanism of FIG. 1 in the locked configuration, along the line 4-4 in FIG. 2.
Figure 5:
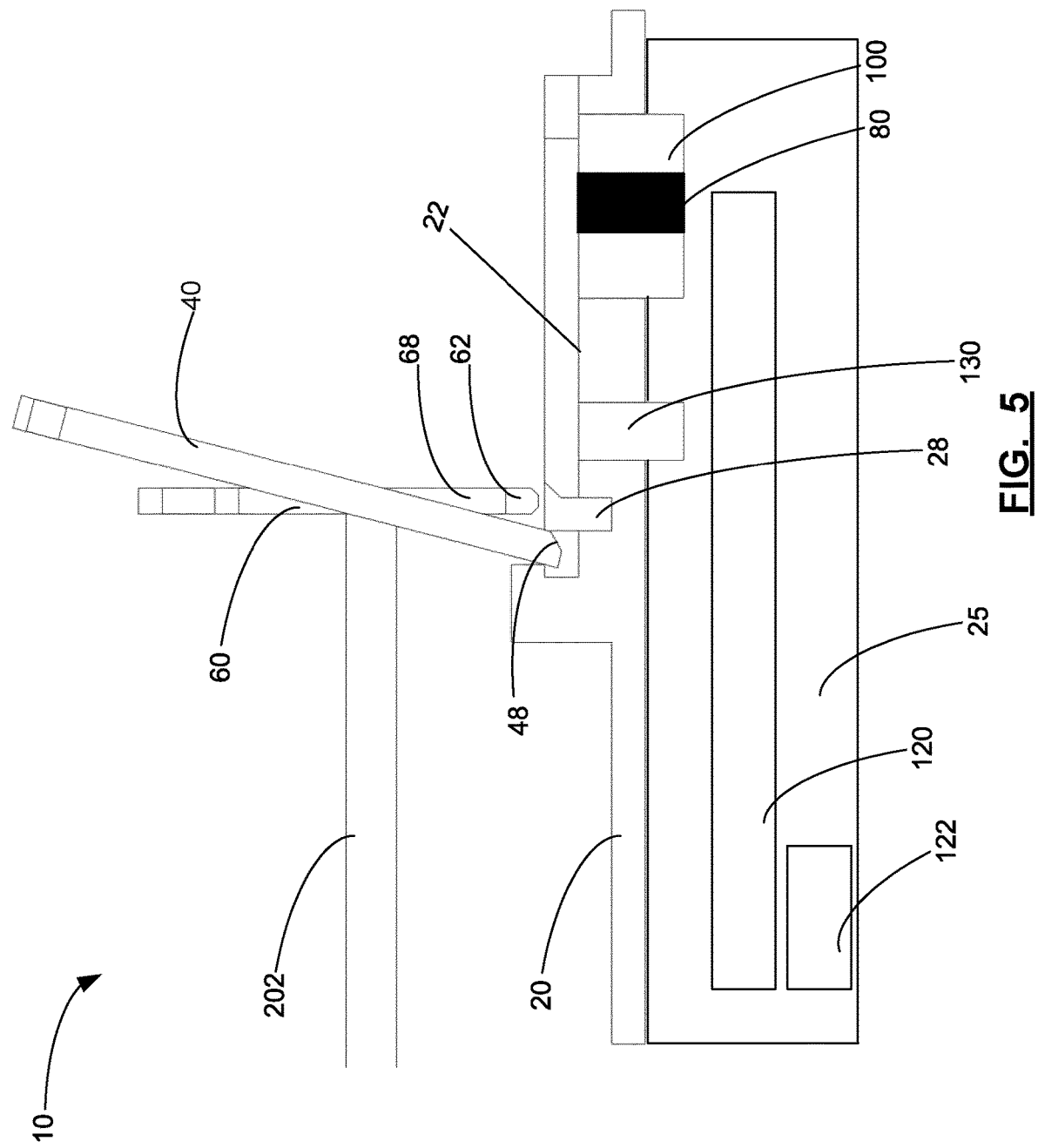
FIG. 5 is a cross-sectional side view of the magnetic locking mechanism of FIG. 1 in the unlocked configuration, along the line 5-5 in FIG. 3.
Figure 6:
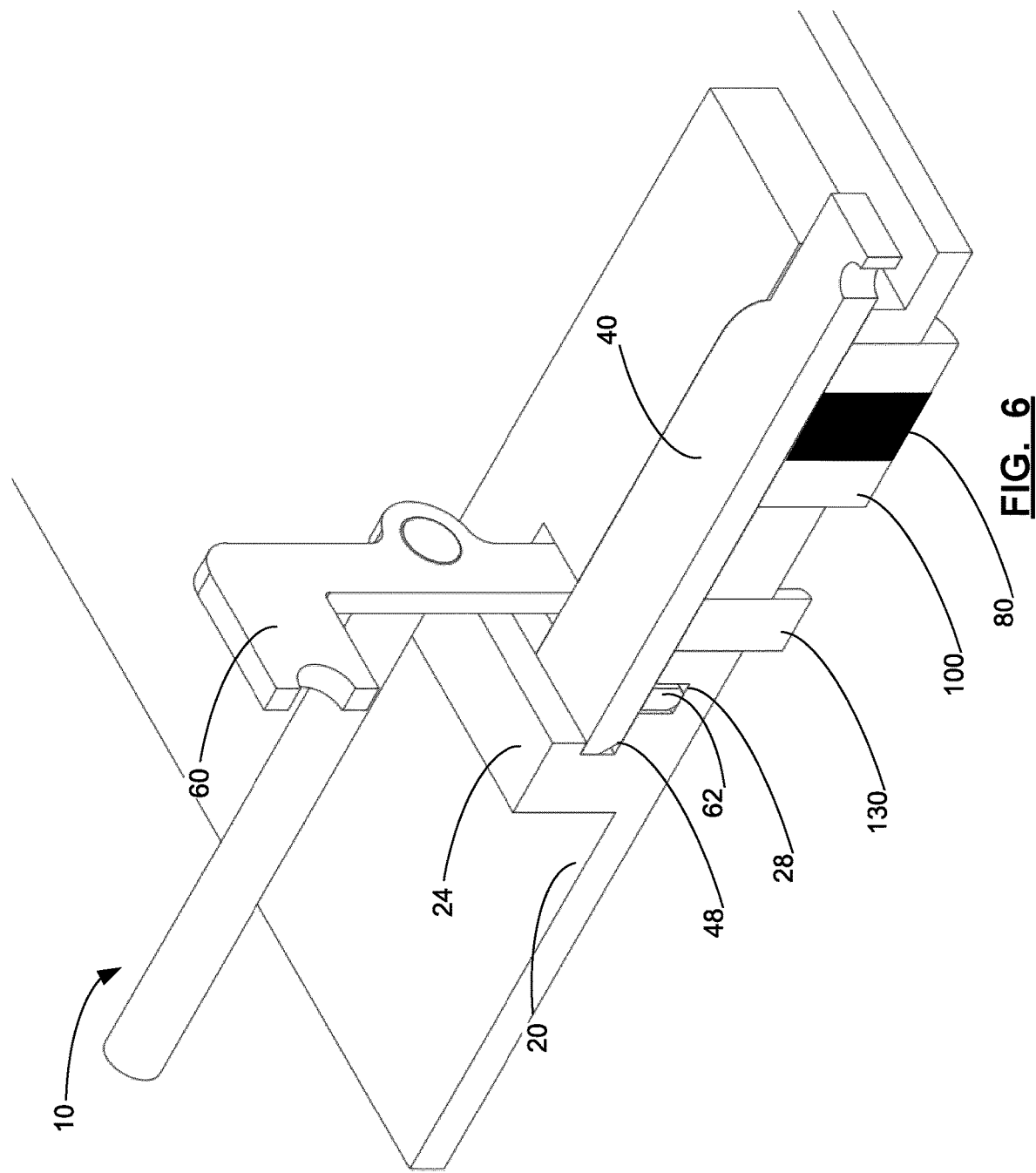
FIG. 6 is a cross-sectional perspective view of the magnetic locking mechanism of FIG. 1 in the locked configuration, along the line 4-4 in FIG. 2.
Figure 7:
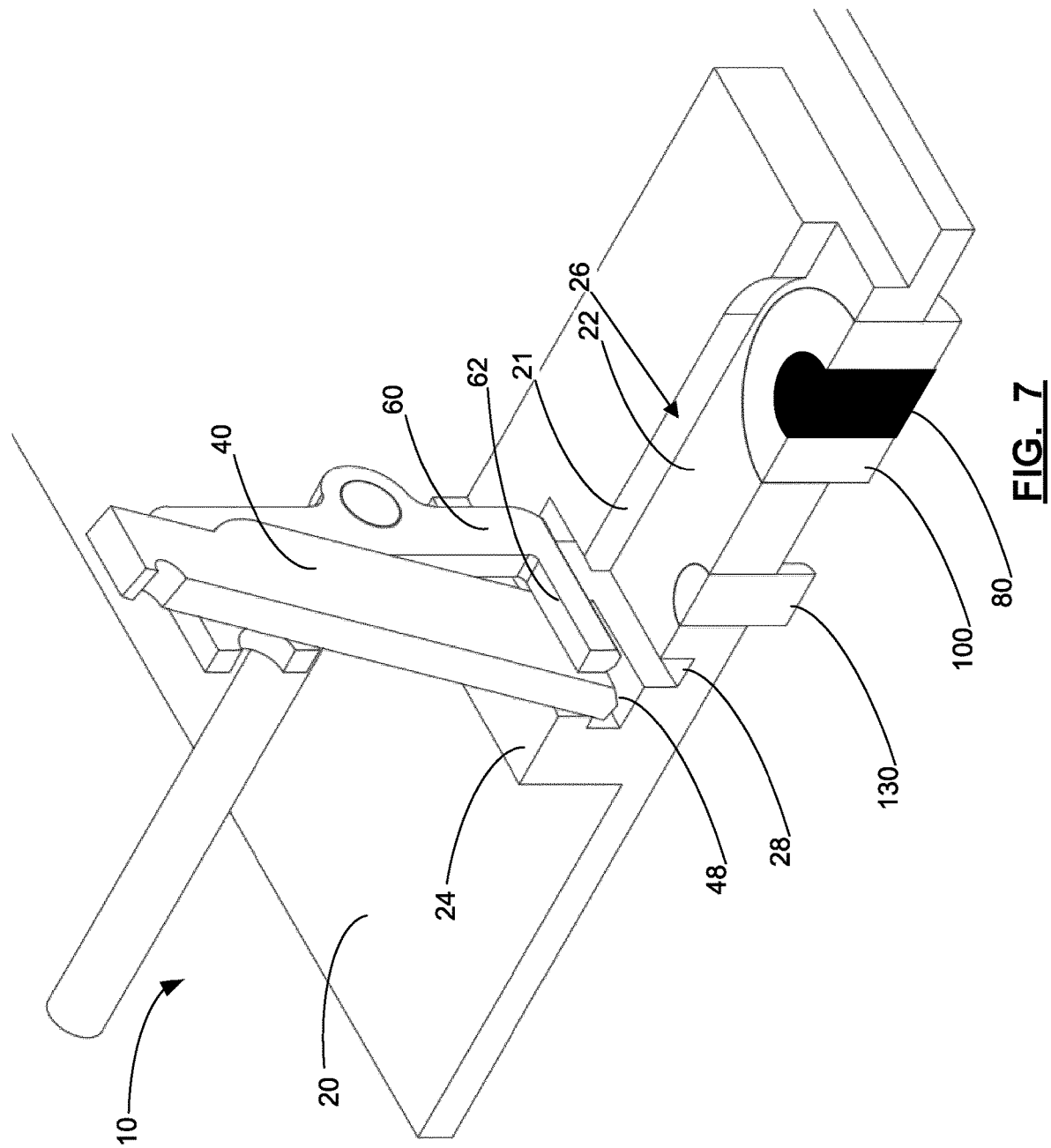
FIG. 7 is a cross-sectional perspective view of the magnetic locking mechanism of FIG. 1 in the unlocked configuration, along the line 5-5 in FIG. 3.

With reference to FIGS. 4 and 5, the mechanism 10 includes a controller 120. In the illustrated example, the controller is operatively coupled to a wireless transceiver 122 and to the electromagnet 100. It will be appreciated that the wireless transceiver 122 may be any device capable of transmitting and/or receiving a wireless signal. It will also be appreciated that the mechanism 10 may include two or more wireless transceivers 122.

In some embodiments, one or more wireless transceivers 122 may include an RF communication interface, such as transceivers configured according to Wi-Fi™ Bluetooth™, and/or other wireless protocols. Providing one or more RF transceivers may have one or more advantages. For example, controller 120 may be connected to a central computing unit (e.g., a tablet, smartphone, or other mobile computing device) that may be used to configure the mechanism 10 and/or check its status while on deck.

In some embodiments, wireless transceiver 122 may be an acoustic transducer such as a hydrophone. For example, as illustrated in FIG. 1, the mechanism 10 may include an acoustic transducer 74.

In some embodiments, the controller 120 may be configured to activate the electromagnet 100 in response to a signal received by the wireless transceiver 122. For example, in response to receiving a predetermined release signal via acoustic transducer 74, controller 120 may activate the electromagnet 100. An advantage of this configuration is that the mechanism 10 may be released 'on demand' from a vessel in acoustic range.

In some embodiments, the mechanism 10 may be coupled to an openable member 200 moveable between a closed position and an open position such that when the mechanism 10 is in the locked configuration, the openable member 200 is held in the closed position. When the mechanism 10 is in the unlocked configuration, the openable member 200 may be moved to the open position.

In some embodiments, the permanent magnet 80 and the electromagnetic 100 may be covered by a material to waterproof the magnetic components. The material may be any other material securely fastened within the release plate area 26 to protect the magnetic components from water exposure. For example, the material may be, including, but not limited to, a magnetic stainless steel (440C) sheet. In some embodiments, the material may be a coating applied to one or more surfaces of the locking mechanism 10.

This embodiment may be used, for example, in rope-on-command fishing applications. As exemplified in FIGS. 1 and 11, the openable member 200 is the lid to a cage 220. The lid 200 is coupled to the buckle 60 by an arm 202. Thus, when the electromagnet 100 is energized, the magnetic force acting on the release plate 40 is reduced and the buckle 60 may be removed from the buckle recess 28 by the buoyant member 72 and/or the key buoy 76. As the buckle 60 is lifted by the buoyant member 72, the buckle 60 moves the lid 200 to the open position. The cage 220 may contain a rope (not shown) with one end coupled to the lid 200 and another end coupled to the cage 220. The lid 200 may be removable from the cage 220 such that when the lid 200 is moved to the open position, the buoyant member 72 separates the lid 200 from the cage 200. The buoyant member 72 may then rise to the surface of the water, bringing the lid 200 attached to the rope. The cage 220 may be retrieved from the ocean floor by pulling up the rope.

An advantage of this design is that the rope may be contained within the cage 220 on the bottom of the ocean, preventing the rope from entangling with boats or sea animals. Then, when the user decides to retrieve the cage 220, the electromagnet 100 may be energized, facilitating the release of the rope and buoyant member 72 to the surface of the water.

Magnetic Sensor

In accordance with this aspect, which may be used by itself or in combination with one or more other aspects, mechanism 10 includes a sensor 130. The sensor is configured to detect the presence of the magnetic field 82 in the release plate 40. An advantage of this aspect is that it may allow the mechanism 10 to automatically determine that it is in a locked configuration.

In the illustrated example, sensor 130 is a magnetic sensor configured to detect the presence of the magnetic field 82 in the release plate 40. It will be appreciated that the sensor 130 may be any sensor capable of detecting a magnetic field. In some embodiments, the sensor 130 may be a magnetic reed switch and/or a Hall effect sensor.

Figure 8:
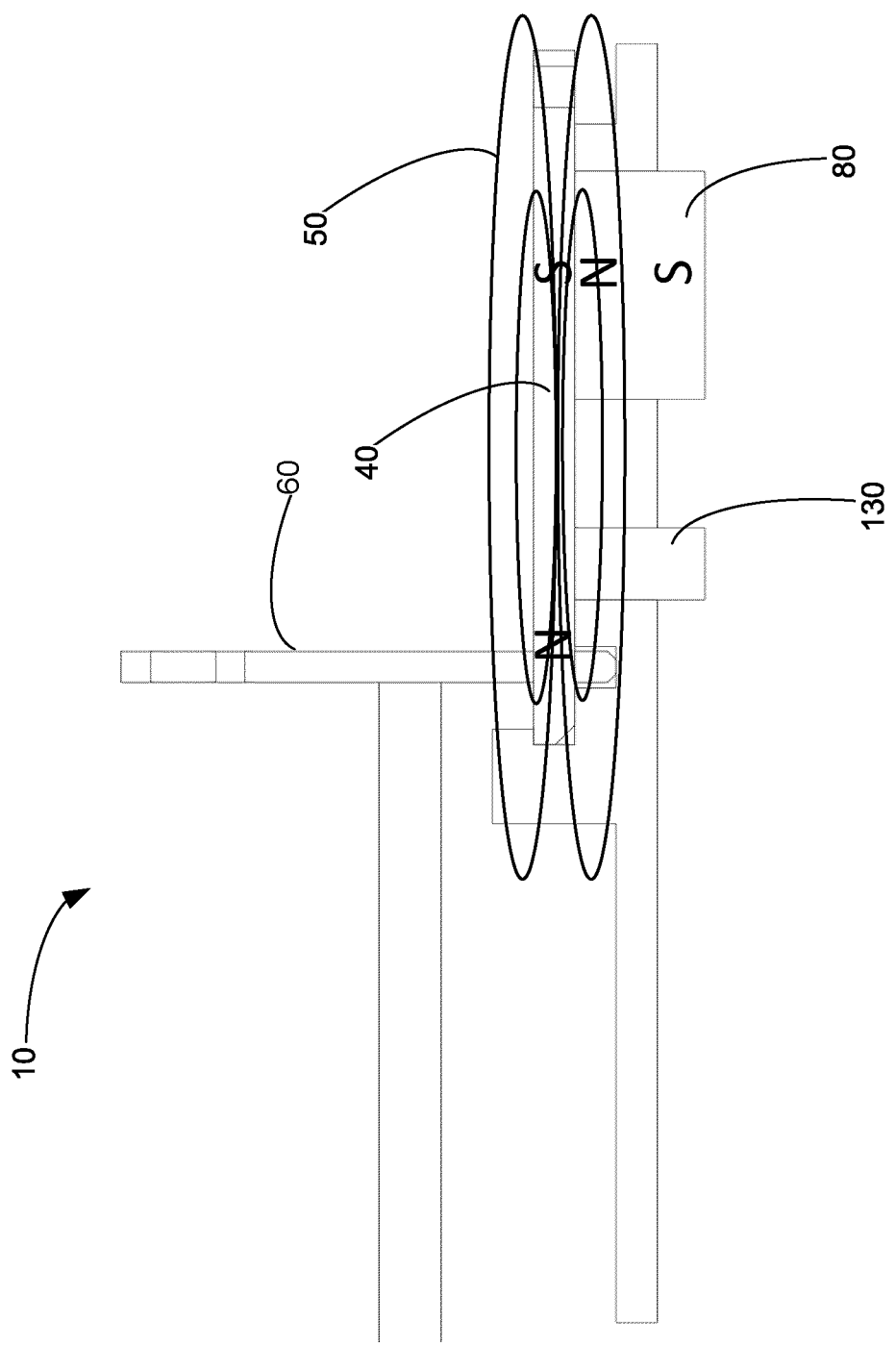
FIG. 8 is an illustration of a magnetic field in the magnetic locking mechanism of FIG. 1 in a locked configuration.

As illustrated in FIG. 8, the sensor 130 is positioned below the area 26 and between the permanent magnet 80 and the first end 27. When the release plate 40 is positioned within the release plate area 26 and the electromagnet 100 is powered off, the magnetic field 82 induces a third magnetic field 50 in the release plate 40. As shown, the third magnetic field 50 may extend perpendicular to the first magnetic field 82 such that the third magnetic field 50 extends along the length of the release plate 40, towards the sensor 130. Accordingly, the sensor 130 detects an increased strength in the magnetic field due to the third magnetic field 50 within the release plate 40. The sensor 130 is preferably positioned proximate the release plate 40 such that when the release plate 40 is within the area 26, the sensor 130 detects the presence of the third magnetic field 50 in the release plate 40, indicating that the release plate 40 is in the locked configuration.

Figure 9:
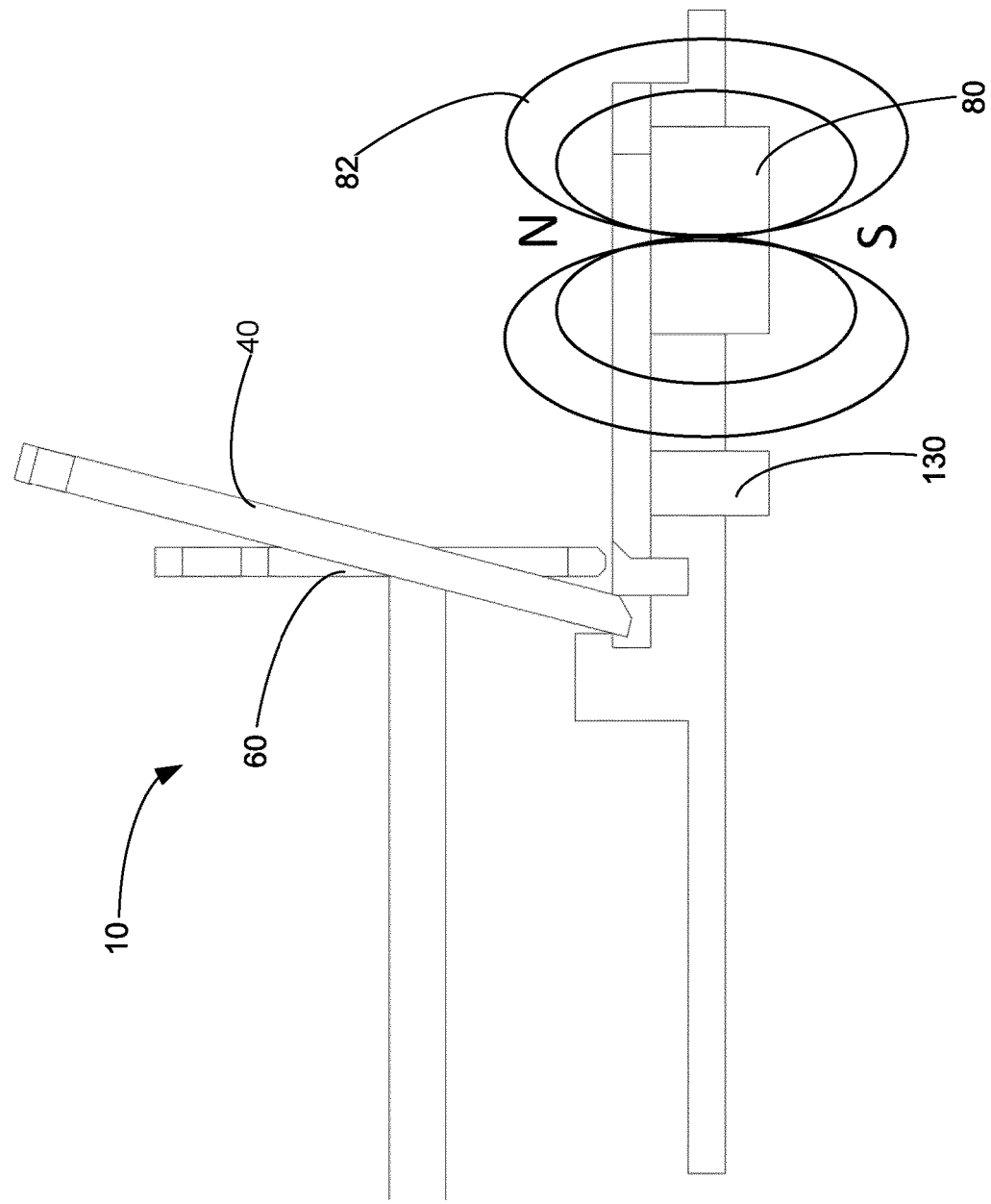
FIG. 9 is an illustration of the magnetic field in the magnetic locking mechanism of FIG. 1 in an unlocked configuration.

As illustrated in FIG. 9, when the release plate 40 is not within the area 26, the third magnetic field 50 is not present in the release plate 40. Accordingly, the first magnetic field 82 is aligned with the sensor 130 such that the sensor detects a weaker magnetic field, indicating that the release plate 40 has been released from the area 26.

As exemplified, the sensor 130 is positioned proximate to the release plate area 26. In some embodiments, the sensor 130 may abut the release plate 40 when the release plate 40 is positioned within the release plate area 26.

As exemplified in FIGS. 4 and 5, the sensor 130 is operatively connected to the controller 120. The controller 120 may be configured to monitor the sensor 130 to detect the presence of the third magnetic field 50 and, in response to detecting the presence of the third magnetic field 50, output a signal indicating that the release plate 40 is magnetically secured within the area 26.

In some embodiments, the controller 120 may include a timer, and the controller may be configured to activate the electromagnet 100 in response to a predetermined period of time elapsing following the receipt of a signal indicating that the release plate 40 is magnetically secured within the area 26. An advantage of this configuration is that the mechanism 10 may be released automatically after a predetermined time period has elapsed. For example, a user may configure controller 120 to activate the electromagnet 100 (facilitating the release of the rope and buoyant member 72 to the surface of the water) after the release mechanism has been submerged for a predetermined period of time, e.g., where the release mechanism is submerged shortly after the release plate 40 is magnetically secured.

In some embodiments, the base plate 20 may include a visual indicator (not shown) and the controller 120 may be configured to output the signal to the visual indicator to indicate to the user that the release plate 40 is magnetically secured. In other words, the visual indicator may indicate to the user that the mechanism 10 is armed and ready to be used.

In some embodiments, controller 120 may be operatively connected to a remote computing device and the signal indicating that the release plate 40 is magnetically secured within the area 26 may be sent to the remote computing device. For example, the signal may be sent automatically by the controller in response to detecting the presence of the third magnetic field 50. A user may then check the remote computing device to see if the mechanism 10 is armed, and/or use the remote computing device to configure the operation of controller 120 (e.g., set the predetermined time period for controller 120 to activate the electromagnet 100 after release plate 40 has been magnetically secured). In some embodiments, the controller 120 may be configured to output the signal to the remote computing device via one or more wireless transceivers 122.

An advantage of this design is that the user may reliably determine the configuration of the device by inserting or removing the release plate 40, without the need to verify the positioning of any other component of the mechanism 10. The visual indicator and/or remote computing device may further indicate to the user whether the mechanism 10 is armed or disarmed. Accordingly, the determination of the armed/disarmed state of the mechanism 10 may be easily performed with thick gloves, in cold weather, and/or in the dark. This simple indication may improve the workflow of the user.

Another advantage of this design is that the mechanism 10 may be reliably armed/disarmed without the need for precision machined components or high-pressure seals. The mechanism 10 may be easily locked by inserting the release plate 40 into the area 26 and the locked status may be simultaneously verified by the sensor 130 as the release plate 40 is received by the area 26. Similarly, mechanism 10 may be unlocked by activating the electromagnet 100, which, when used underwater, results in the release plate 40 being lifted out of the base plate 20 by the buoyant member 72 and/or the key buoy 76. Accordingly, the only moving parts are the release plate 40 moving out of the release plate area 26 and the buckle 60 moving out of the buckle recess 28. This design may reduce the likelihood of failure in the mechanism 10, as e.g., there are no sliding or turning parts requiring precise connections. Furthermore, when used underwater, this design has the advantage of being tolerant to the build-up of marine bio-fouling and/or corrosion.

In some embodiments, the electronic components of the mechanism 10 may be potted to a downwardly facing surface 23 of the base plate 20. The potting 25 may protect the electronics in the mechanism 10 without the need of an air chamber to keep the electronics dry when the mechanism 10 is used underwater.

In some embodiments, the controller 120 may be operatively connected to an inventory management system. The inventory management system may then keep track of the state (armed or disarmed) of each mechanism 10 used on the inventory.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "an embodiment", "embodiment", "embodiments", "the embodiment", "the embodiments", "one or more embodiments", "some embodiments", and "one embodiment" mean "one or more (but not all) embodiments of the present invention(s)", unless expressly specified otherwise.

The terms "including", "comprising", and variations thereof mean "including but not limited to" unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5%, or 10%, for example, if this deviation does not negate the meaning of the term it modifies.

As used herein and in the claims, two elements are said to be "parallel" where those elements are parallel and spaced apart, or where those elements are collinear.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A magnetic release mechanism for use with underwater fishing equipment comprising a buoyant element, the magnetic release mechanism comprising:
   a base plate having an upwardly facing surface that includes a buckle recess and a release plate area, the area having a first end and a second end, the area overlying at least a portion of the buckle recess;
   a buckle having a first end releasably received in the recess, wherein an aperture extends through a width of the buckle;

a release plate positioned in the area and extending at least partially through the aperture, the release plate having a first end and a second end;

a mechanical restraining member positioned proximate the first end of the area and inhibiting upward displacement of the first end of the release plate;

a permanent magnet positioned proximate the second end of the area and below the area, the permanent magnet generating a first magnetic field;

an electromagnetic coil positioned proximate the permanent magnet and configured to selectively generate a second magnetic field when energized; and a magnetic sensor positioned below the area and between the permanent magnet and the first end of the area, the sensor being configured to detect the presence of a third magnetic field;

wherein, in a locked configuration, the electromagnetic coil is de-energized, upward displacement of the second end of the release plate is inhibited by a first magnetic force resulting from the first magnetic field, and an upward force exerted on the buckle by the buoyant element is insufficient to displace the first end of the buckle from the recess, and wherein, in an unlocked configuration, the electromagnetic coil is energized, upward displacement of the second end of the release plate is inhibited by a second magnetic force resulting from the first magnetic field and the second magnetic field, the second magnetic force being less than the first magnetic force, and the upward force exerted on the buckle by the buoyant element is sufficient to displace the first end of the buckle from the recess.

2. The magnetic release mechanism of claim 1, wherein the recess is positioned proximate the first end of the area.

3. The magnetic release mechanism of claim 1, wherein the base plate further comprises one or more projections extending upwardly from the upwardly facing surface to inhibit lateral displacement of the release plate relative to the upwardly facing surface.

4. The magnetic release mechanism of claim 3, wherein the one or more projections restrain the second end of the release plate from moving in a plane parallel to the upwardly facing surface.

5. The magnetic release mechanism of claim 1, wherein the mechanical restraining member comprises a flange that overhangs the first end of the area.

6. The magnetic release mechanism of claim 1, wherein, in the locked position, the release plate abuts the sensor.

7. The magnetic release mechanism of claim 1, wherein the first end of the release plate has a chamfered edge.

8. The magnetic release mechanism of claim 1, further comprising a controller configured to provide a signal when the sensor detects the presence of the third magnetic field.

9. The magnetic release mechanism of claim 1, wherein the buckle is coupled to an openable member, the openable member moving from a closed position to an open position when the first end of the buckle is removed from the buckle recess.

10. The magnetic release mechanism of claim 1, wherein the first magnetic force is between about 15 lb to about 35 lb, optionally about 25 lb.

11. The magnetic release mechanism of claim 1, further comprising at least a second buoyant element.

12. The magnetic release mechanism of claim 11, wherein the buoyant element is configured to exert (i) an upward force of about 16 lb. to about 200 lb. when submerged at a depth of about 50 m to about 200 m below sea level, and/or (ii) an upward force of about 150 lb. when submerged at a depth of about 100 m below sea level.

13. The magnetic release mechanism of claim 1, further comprising an acoustic receiver and a controller, wherein the controller is configured to:
monitor the acoustic receiver; and
in response to detecting an acoustic release signal, energize the electromagnetic coil.

14. The magnetic release mechanism of claim 1, further comprising a controller, wherein the controller is configured to:
monitor the sensor; and
in response determining that a predetermined time period following detecting the presence of the third magnetic field has elapsed, energize the electromagnetic coil.

15. Fishing equipment, optionally a trap such as a lobster trap or other crustacean trap, comprising the magnetic release mechanism of claim 1, wherein optionally the equipment or trap comprises a cage, and optionally the magnetic release mechanism is coupled to an openable member moveable between a closed position and an open position.

16. A magnetic release mechanism for use with underwater fishing equipment comprising a buoyant element, the magnetic release mechanism comprising:
a base plate having a slot for receiving a buckle, and a recess for receiving a release plate, the recess having a first end and a second end;
a permanent magnet positioned proximate the recess and closer to the second end than the first end, the permanent magnet generating a first magnetic field for magnetically coupling the release plate to the base plate;
an electromagnetic coil positioned proximate the permanent magnet and configured to selectively generate a second magnetic field when energized;
a magnetic field sensor positioned proximate the recess and between the first end and the permanent magnet; and
a controller operatively coupled to the magnetic field sensor;
wherein the controller is configured to:
monitor the magnetic field sensor to detect the presence of a third magnetic field; and
in response to detecting the presence of a third magnetic field, output a signal indicating that the release plate is magnetically secured within the recess.

17. The magnetic release mechanism of claim 16, wherein the magnetic field sensor comprises a magnetic reed sensor.

18. The magnetic release mechanism of claim 16, wherein the controller is configured to output the signal to a remote computing device, optionally further comprising a wireless transceiver, and wherein the controller is configured to output the signal to the remote computing device via the wireless transceiver.

19. The magnetic release mechanism of claim 16, further comprising a visual indicator coupled to the base plate, wherein the controller is configured to output the signal to the visual indicator.

20. The magnetic release mechanism of claim 16, wherein the controller is further configured to:
in response determining that a predetermined time period following detecting the presence of the third magnetic field has elapsed, energize the electromagnetic coil.

* * * * *